United States Patent [19]

Vivian

[11] 4,154,154
[45] May 15, 1979

[54] SKEWERED FOOD COOKING DEVICES

[76] Inventor: Weldon B. Vivian, 32 W. 140 83rd St., Naperville, Ill. 60540

[21] Appl. No.: 691,863

[22] Filed: Jun. 1, 1976

[51] Int. Cl.² ........................................... A47J 37/04
[52] U.S. Cl. .................................. 99/421 HH; 99/419
[58] Field of Search ........... 99/421 H, 421 R, 421 A, 99/421 HH, 421 HV, 421 P, 420, 425; 46/39, 40, 204, 219; 74/424.5, 424.7, 425; 248/226.4, 214; 126/333

[56] References Cited

U.S. PATENT DOCUMENTS

| | | | |
|---|---|---|---|
| 97,831 | 12/1869 | Swett | 126/333 X |
| 235,362 | 12/1880 | Jordan et al. | 126/333 X |
| 511,269 | 12/1893 | Holmes | 74/424.7 |
| 759,560 | 5/1904 | Sharp | 248/226.4 X |
| 1,087,005 | 2/1914 | Fedderson | 248/226.4 |
| 1,643,917 | 9/1927 | Becker | 46/204 |
| 2,306,519 | 12/1942 | Bobo | 99/421 HH |
| 2,346,628 | 4/1944 | Todd | 99/421 HH X |
| 2,485,890 | 10/1949 | Keljik | 99/421 HV |
| 2,590,470 | 3/1952 | Skocic | 99/421 V |
| 2,826,984 | 8/1954 | Krull | 99/421 HH |
| 2,939,384 | 6/1960 | Vinson | 99/421 HH |
| 3,017,819 | 1/1962 | Manteris | 99/421 HH |
| 3,126,814 | 3/1964 | Brown | 99/421 H |
| 3,169,470 | 2/1965 | Oatley | 99/421 HH |
| 3,196,776 | 7/1965 | Norton | 99/421 P |
| 3,442,202 | 5/1969 | Ishida | 99/421 R |
| 3,447,445 | 6/1969 | Koziol | 99/421 R |
| 3,715,530 | 2/1973 | Dalton | 74/424.7 X |
| 3,733,999 | 5/1973 | Bernstein | 99/421 H |
| 3,741,103 | 6/1973 | Hwag | 99/421 A |
| 3,797,326 | 3/1974 | Conlee | 74/425 |
| 3,866,527 | 2/1975 | Katris | 99/421 H |
| 3,939,761 | 2/1976 | McGinty | 99/421 H |

FOREIGN PATENT DOCUMENTS

| | | | |
|---|---|---|---|
| 397892 | 8/1966 | Switzerland | 99/421 H |
| 1281520 | 7/1972 | United Kingdom | 74/424.5 |

Primary Examiner—Harvey C. Hornsby
Assistant Examiner—Arthur O. Henderson
Attorney, Agent, or Firm—Hill, Gross, Simpson, Van Santen, Steadman, Chiara & Simpson

[57] ABSTRACT

Several forms of skewered food cooking devices are disclosed, each of which provides means for replaceably supporting a plurality of loaded skewers generally cantilever fashion in cooking relation to a heat source, and means for effecting rotation of each of the skewers about its axis while supported in the cantilever fashion. The rotation effecting means comprise a driven member for each of the skewers, and rotary driving member common to all of the skewers and with which the driven members engage releasably.

23 Claims, 22 Drawing Figures

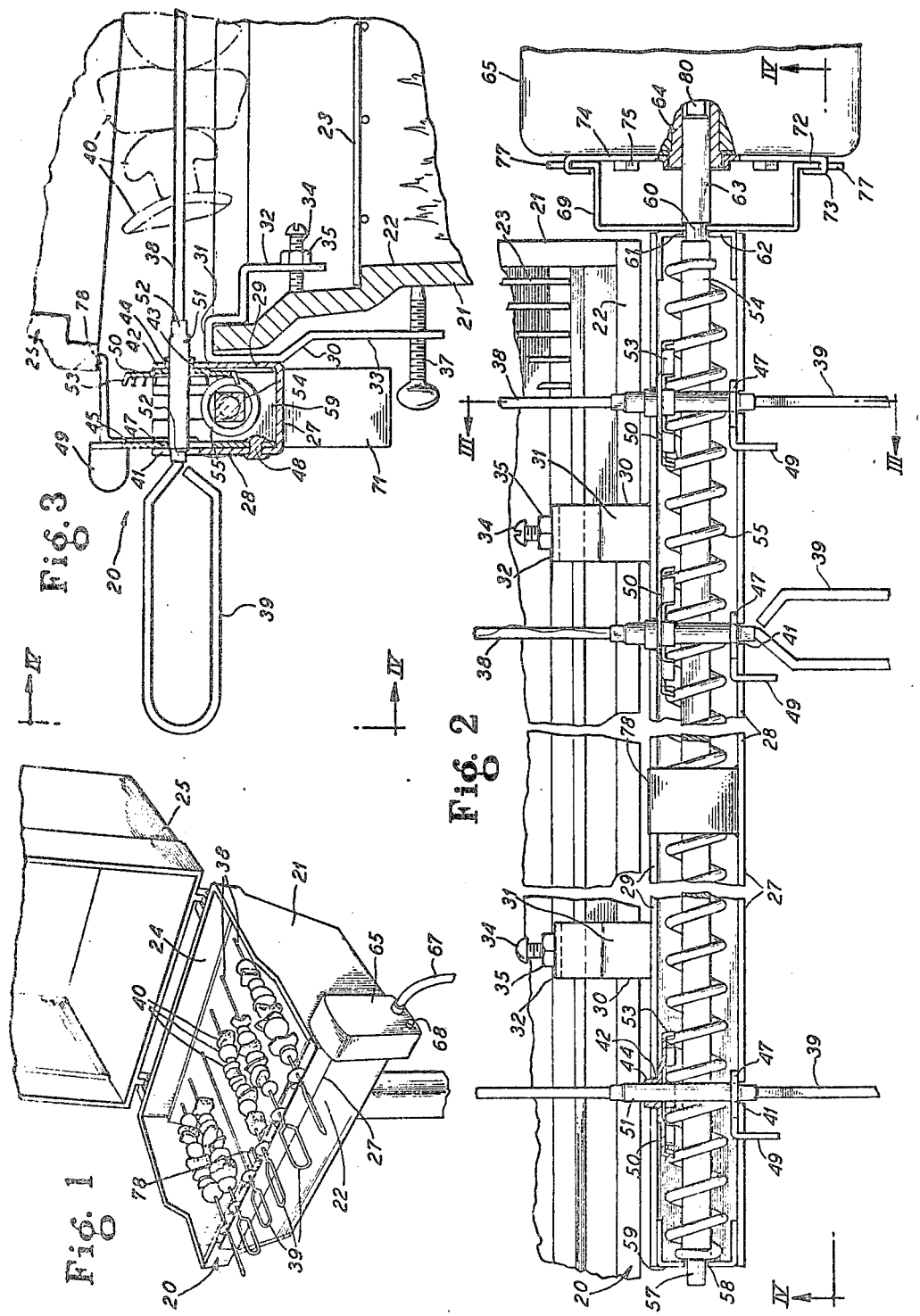

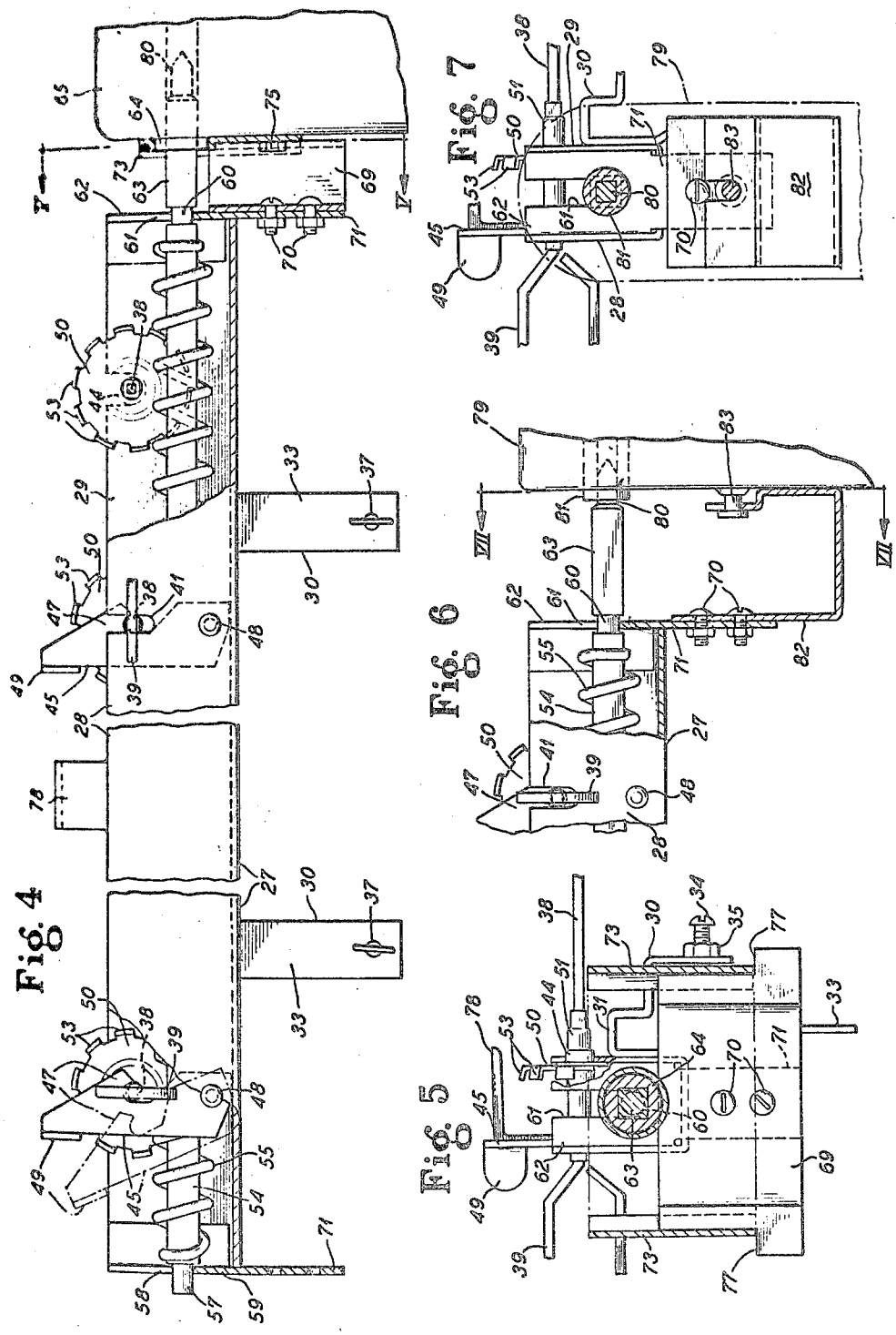

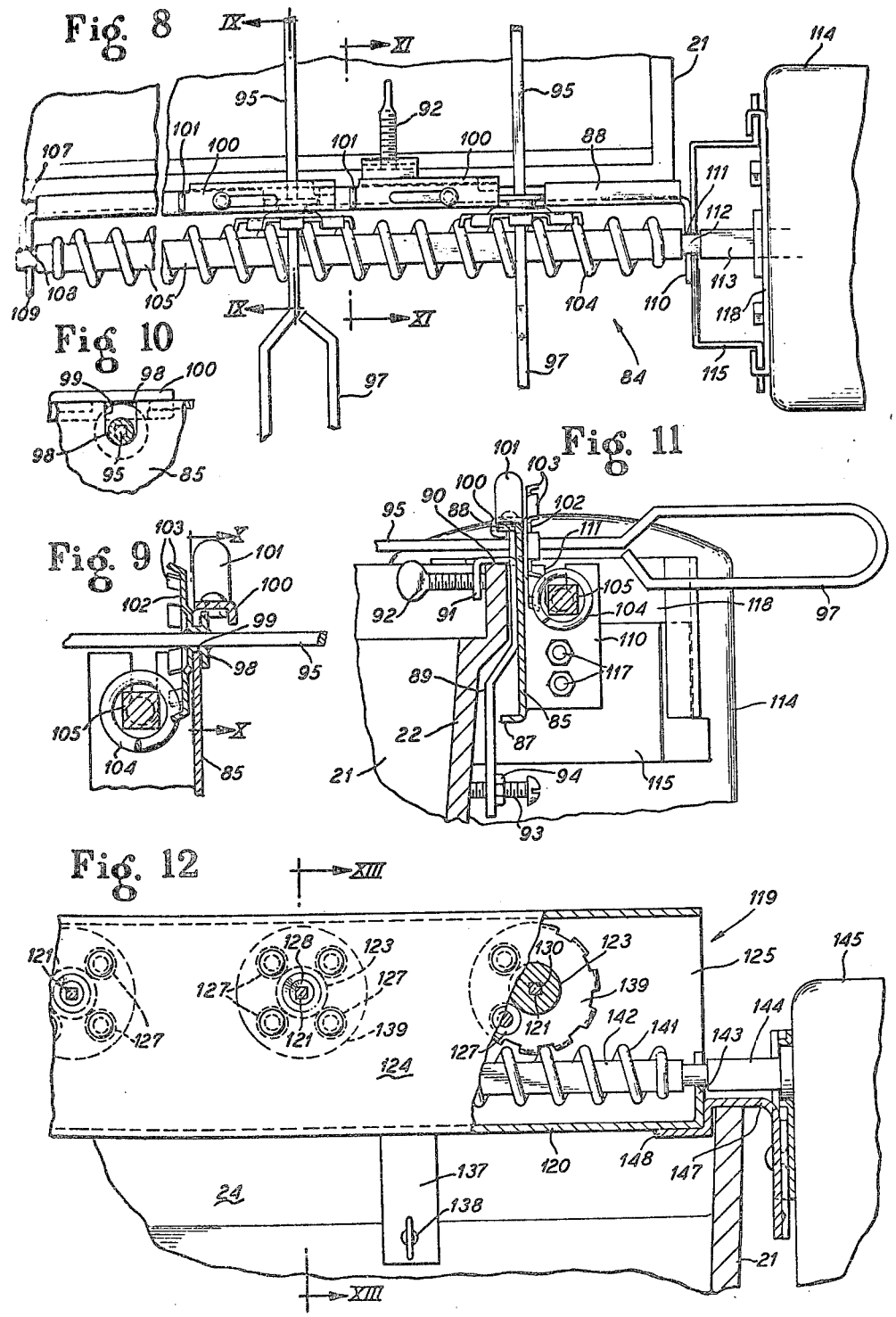

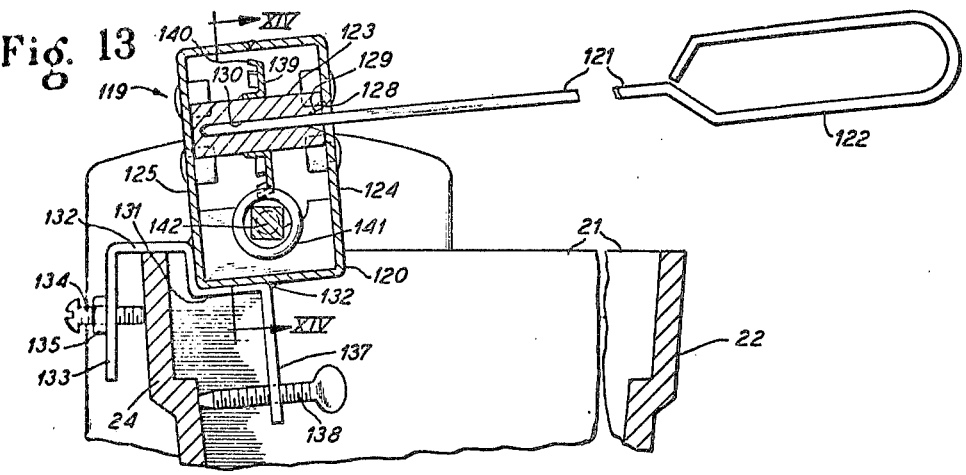
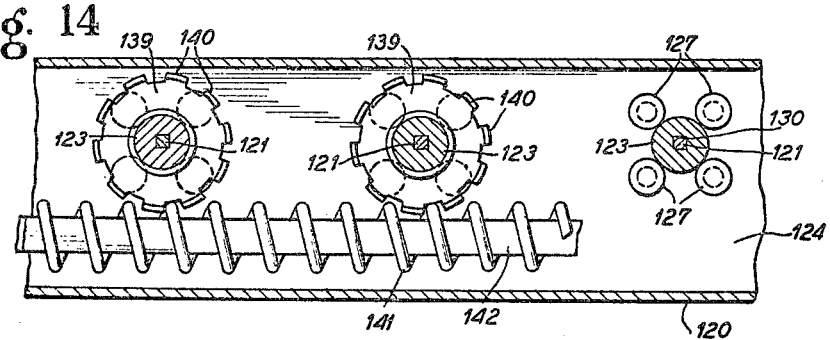
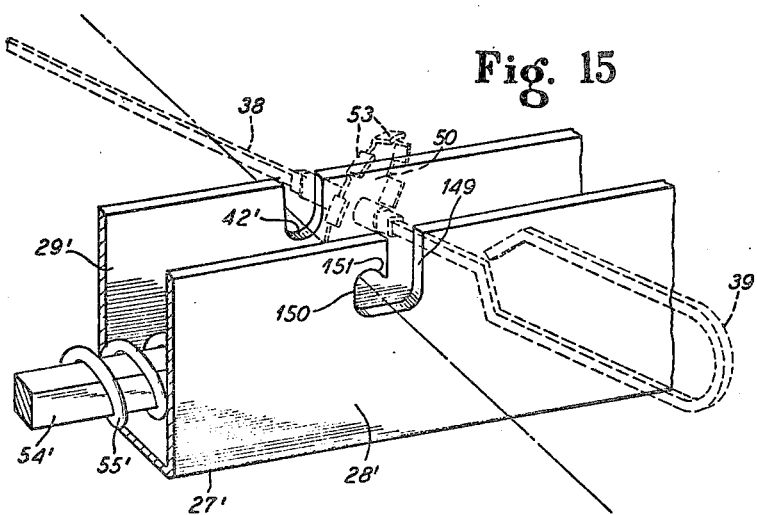

SKEWERED FOOD COOKING DEVICES

This invention relates to skewered food cooking devices, and is more particularly concerned with such devices adapted to be mounted on outdoor or indoor cooking means.

Cooking food by means of skewers on cooking means such as grills has heretofore been effected manually such as by placing the skewers across the heat source with both of the opposite end portions of the skewers supported. Conventionally rotation of the skewers has been effected manually. However, this is a rather haphazard mode of cooking and requires expert personal attention in order to secure anything like satisfactory results.

A commercially available arrangement of rotatably powered skewers requires supports to be mounted on both the front and rear walls of a cooking grill receptacle, and driving of the skewers is by means of an endless chain. Such arrangement requires an excessive number of different parts, and the drive chain structure is difficult to keep clean and sanitary and is expensive.

An important object of the present invention is to provide new and improved skewered food cooking devices which will overcome the disadvantages, deficiencies, inefficiencies, shortcomings and problems encountered in and with expedients, and to provide new and improved powered skewered food cooking devices for simply, efficiently, and economically attaining the intended purpose.

Another object of the present invention is to provide skewered food cooking devices which require attachment to only one wall of a barbecue grill receptacle or the like, whereby to support the skewers cantilever fashion in a cooking zone.

A further object of the invention is to provide new and improved skewer driving means for powered skewered food cooking devices.

According to features of the invention a skewered food cooking device comprises means for replaceably supporting a plurality of loaded skewers generally cantilever fashion in cooking relation to a heat source, and means for effecting rotation of each of the skewers about its axis while supported in the cantilever fashion.

According to other features of the invention, there is provided a skewered food cooking device comprising means for replaceably supporting a plurality of loaded skewers in cooking relation to a heat source, means for effecting rotation of each of the skewers about its axis and comprising a driven member for each skewer, a rotary driving member having means with which the driven members engage, and means for rotating the driving member and thereby rotating the driven members for rotating the skewers.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a perspective view of a cooking appliance, represented for purposes of illustration by a so-called barbecue grill, on which is mounted a skewered food cooking device embodying features of the invention.

FIG. 2 is a fragmental, enlarged top plan view of the device depicted in FIG. 1.

FIG. 3 is an enlarged fragmentary sectional detail view taken substantially along the line III—III of FIG. 2.

FIG. 4 is a fragmental front elevational view, partially in section taken substantially in the plane of line IV—IV of FIG. 2.

FIG. 5 is a sectional detail view taken substantially along the line V—V of FIG. 4.

FIG. 6 is a fragmentary sectional elevational view showing modified means for mounting a driving motor on the supporting frame of the device.

FIG. 7 is a sectional elevational detail view taken substantially along the line VII—VII in FIG. 6.

FIG. 8 is a fragmental top plan view showing a modified form of the device.

FIG. 9 is a fragmentary sectional detail view taken substantially along the line IX—IX of FIG. 8.

FIG. 10 is a fragmentary sectional elevational detail view taken substantially along the line X—X of FIG. 9.

FIG. 11 is a sectional detail view taken substantially along the line XI—XI of FIG. 8.

FIG. 12 is a fragmentary side elevational view, partially in section, of a further modified form of the device.

FIG. 13 is a vertical sectional detail view taken substantially along the line XIII—XIII of FIG. 12.

FIG. 14 is a fragmentary vertical sectional detail view taken substantially along the line XIV—XIV of FIG. 13.

FIG. 15 is a fragmentary perspective view showing another modification.

Figure 16:
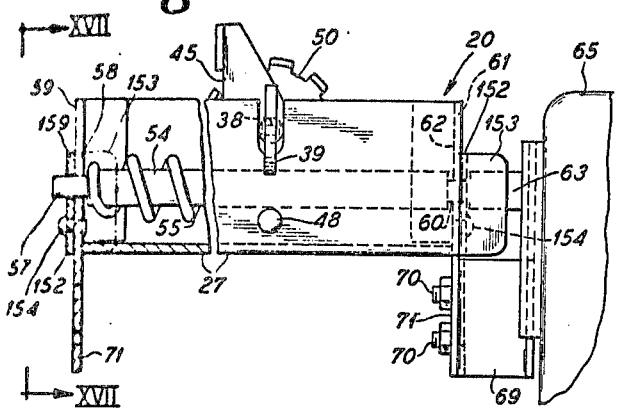
FIG. 16 is a fragmental sectional elevational view showing a device similar to FIG. 4, and depicting means for locking the drive shaft against unintended upward displacement.

A skewered food cooking device 20 (FIG. 1) embodying features of the invention is constructed and arranged to be mounted in operative relation on any preferred form of cooking appliance, such as a picnic or barbecue grill unit 21 having a receptacle including a horizontally generally straight upstanding front wall 22 on which the device 20 is adapted to be secured. In the illustrated example, the grill unit 21 is of the popular form having a generally pan-shaped receptacle for holding a cooking heat source such as burning charcoal or charcoal briquettes, electric heating element, gas burner or the like, and above which may be mounted a food supporting grid 23 (FIGS. 2 and 3). Along a rear wall 24 the grill unit may carry a hingedly attached cover 25.

In a preferred form, the device 20 comprises an elongated, rigid, generally channel shaped body frame 27 having spaced upstanding respective front and rear walls 28 and 29 (FIGS. 2 and 3). The frame 27 is adapted to be made from suitable gauge sheet metal which may be easily formed up into the channel shaped structure. Means for detachably securing the body 27 along the upper outer side of the receptacle front wall 22 comprise a pair of brackets 30 which may be conveniently secured as by welding to the frame rear wall 29. Each of the brackets 30 has a downwardly facing generally yoke-shaped shoulder portion 31 to receive and rest on the upper edge of the wall 22. A relatively short downwardly extending bracket leg 32 is disposed opposite the inside of the upper portion of the wall 22, and a relatively longer front bracket leg 33 is located to extend downwardly along the outside of the upper portion of the wall 22. For grippingly resisting displacement of the device 20, fastening means are provided on each of the brackets 30 comprising a machine screw 34 threadedly supported by the leg 32 and adapted to be driven endwise against the opposed inside surface of the wall 22 and may be locked as by means of a locknut 35. Means comprising a thumb screw 37 threadedly carried by the leg 33 at a lower elevation than the screw 34 thrusts at its tip against the outer surface of the front wall 22 in opposition to the thrust of the higher screw 34. Because of the leverage length of the leg 33 and location of the screw 37 near the lower end of the leg 33 leveling adjustments of the body 27 about its longitudinal axis are readily effected by manipulation of the screws 37.

Means are provided on the upper portions of the walls 28 and 29 of the device for operatively supporting a plurality, such as six, food supporting skewers 38 each of which has a straight shank of substantial length having a sharpened tip at one end and a handle 39 formed on its opposite end. In a typical construction the skewers 38 may be on the order of seventeen inches in overall length and formed from suitable polygonal, such as square, steel rod of about 0.125 by 0.125 inch cross section. Such skewers are especially suitable for non-shattering impalement of food materials 40 of diverse brittle character such as onions, mushrooms, and the like, as well as the softer meat, green peppers, and the like, which are skewered together for shis-kabob cookery.

An important advantage of the device 20 resides in the ability to support the loaded skewers 38 in cantilever fashion projecting rearwardly over the top of the front wall 22 to support the food 40 carried by the skewers over the cooking zone provided by the grill unit 21. To this end, the portions of the skewers 38 adjacent to the handles 39 are adapted to bridge across the frame 27 through respective sets of aligned upwardly opening locating slots 41 and 42 in the walls 28 and 29, respectively and disposed at suitably spaced intervals along the length of the frame 27. For stable cantilever support of each skewer, the rear wall slot 42 has a lower end bearing surface 43 with which an annular circular bearing 44 fixed concentrically about the associated skewer 38 is engageable in load bearing relation. While the sides defining the respectively aligned slot 41 do serve to restrain the skewer against transverse canting displacement, means comprising manually operable pivoted latch 45 (FIGS. 2, 3 and 4) at each slot 41 has a retaining head 47 to overlie the skewer shank and prevent unintentional upward displacement of the skewer from the slot. For this purpose the latches 45 may comprise flat metal members secured by pivot means 48 to the wall 28 below the slot 41 and provided on the upper portion of the head 47 with a handle ear 49. Thereby, the latches 45 can be readily swung into clearance relation to the associated slots 41, as shown in phantom outline in FIG. 4, for removal or mounting of one of the skewers 38, and when the skewers are in the mounted cooking position the latches are readily swung into the latching position, as shown in full outline.

Means are provided for effecting rotation of each of the skewers 38 about its axis while supported in the cantilever fashion in cooking relation to the heat source. While such means may comprise the respective handles 39 whereby the skewers may be rotated manually, powered rotation of the skewers is preferred for continuous, even cooking of the skewered food. Accordingly, each of the skewers 38 is equipped with a corotatively related driven member 50 which may be constructed as a suitable stamped sheet metal gear on which the bearing 44 comprises a hub flange on the gear member fixed to and about an adaptor sleeve 51 fixed at its opposite ends 52 as by means of crimping to and about the associated skewer 38. About its perimeter, each of the gear members 50 has a uniformly spaced series of teeth 53 projecting generally toward the handle 39.

In the assembled relationship with the supporting frame 27, the gear members 50 on the skewers 38 are in slidable engagement with the inner face of the wall 29 and face generally toward rotary driving means common to all of the skewers and comprising an elongated drive shaft 54 carrying helical driving means in the form of a heavy gauge wire rod helix 55 having uniformly spaced coils the spacing of which is corelated to the width of the gear teeth 53 for loose meshing of the teeth with the coils. As the helix 55 rotates, the gear members 50 will be correspondingly rotated. In a preferred construction, the shaft 54 may comprise a square rod of somewhat greater length than the frame 27 and the helix 55 is of a length slightly shorter than the frame 27, with the opposite ends of the helix fixed to the shaft 54 as by staking, welding, or any other preferred means. The coils of the helix 55 between the fixed extermities are loosely disposed about the shaft, except that the inside diameter of the coils may be approximately the same as the diameter across the corners of the shaft 54 rod section. This enables ready adjustment of the coils longitudinal of the shaft to compensate for any inaccuracy that might interfere with optimum smooth driving interengagement with the gear teeth 53. Through this arrangement and by having the lower portion of the mounted skewer gears 50 in engagement with, and in effect thrusting toward, the driving helix 55, a stable cantilever support is provided for the rotating skewers 38 substantially free from tilting downwardly under load toward the cooking heat source, and assuring substantially uniform cooking of the skewered food all along each rotating skewer load.

Mounting of the shaft 54 is conveniently effected by means of a cylindrical journal terminal 57 at one end of the shaft engaged within an upwardly opening bearing slot 58 in a supporting bracket piece 59 secured across one end of the frame 27. Adjacent to its opposite end the shaft 54 has a cylindrical journal portion 60 engaged in an upwardly opening bearing slot 61 in a supporting bracket piece 62 secured across that end of the frame 27. Outwardly beyond the journal 60, a coupling end portion 63 of the shaft is adapted to be engaged in a collet 64 or other suitable output device of a suitably housed motorized drive unit 65 geared to effect suitably slow turning of the drive shaft 54. In one desirable form, the drive unit 65 may comprise a suitably housed electrical motor and reduction gear means adapted to be connected with an electrical outlet by means of an electrical cord 67 (FIG. 1), and having a motor control switch 68.

Mounting of the drive unit 65 may be effected by means of a bracket 69 (FIGS. 2, 4 and 5) secured as by means of screws 70 to a depending extension 71 from either of the supporting brackets 59 or 62. Replaceable coupling of the drive unit 65 with the bracket 69 may be effected by downward sliding engagement of oppositely projecting flanges 72 on the bracket 69 within vertical grooves provided by return bent coupling flanges 73 on a coupling plate 74 secured as by means of screws 75 to the drive unit 65. Shoulders 77 on the flanges 72 provide stops for holding the unit 65 in proper orientation with the drive shaft 54 in its working position in the frame 27. Through this arrangement any one or more of the skewers 38 may be placed in position on the supporting frame 27 to be driven by the drive unit 65 through the drive shaft 54 and the helix 55. Further, by having the shaft 54 simply laid into the assembled relation with the frame 27, it is easy to lift the shaft from the frame in the absence of any of the skewers 38, to separate the frame and the shaft for cleaning such as by immersing them in dishwater.

If, during a skewered food cooking session employing the device 20, it is desired to close the cover 25, that may be effected, as shown in FIG. 3, without interferring with rotary operation in either direction of the skewers 38 by supporting the front of the cover 25 on a suitable rest comprising an angular member 78 secured as by welding to and projecting above the wall 28 of the frame 27.

If an electrical outlet is not handy, a battery powered electrical motor drive unit 79 (FIGS. 6 and 7), may be coupled with the drive shaft 54. For this purpose the coupling extension 63 on the drive shaft is desirably provided with a smaller diameter coupling terminal 80 of polygonal cross section adapted to be received drivingly in a collet or other suitable output member 81 of the drive unit 79. For supporting the unit 79 on the supporting frame 27, a bracket 82 may be secured as by means of the screws 70 to the bracket extension 71 for engagement by a hanger stud 83 on the unit 79.

In a modified construction as represented by the device 84 in FIGS. 8-11, an elongated horizontal supporting body frame 85 comprises a flat bar of substantial length and vertical width having a longitudinally extending reinforcing flange 87 along its lower edge and a longitudinally extending reinforcing flange 88 along its upper edge. For connecting the frame 85 in place on the front wall 22 of the grill 21 a plurality of spaced vertically elongated brackets 89 are secured to its rear face as by means of welding. On their upper ends, the brackets 89 are each provided with a shoulder 90 to engage on the upper edge of the wall 22 and a depending flange 91 through which is threaded a thumb screw 92 for thrusting against the inner face of the wall 22 and securing the bracket in place in cooperation with a securing and leveling screw 93 threaded through the lower end portion of the bracket and thrusting against the outer face of the wall 22 and locked as by means of a locknut 94.

Skewers 95 having handles 97 are adapted to be supported in cantilever fashion by the frame 85 to project over the cooking zone of the grill 21. For this purpose each of the skewers 95 has, in adjacent spaced relation to the handle 97, a fixedly corotative annularly grooved journal 98 engageable in a respective complementary upwardly opening bearing slot 99 in the upper edge of the frame member 85. After the journal 98 has been dropped into the slot 99, latching means in the form of a slide 100 mounted on top of the flange 88 may be manipulated as by means of a handle 101 into overlying closing relation to the bearing slot 99 over the journal 98 whereby to retain the skewer against upward displacement relative to the supporting body 85.

Cantilever balancing and rotary driving of the skewers 95 are effected similarly as described for the device 20. For this purpose gear members 102 generally similar to the gears 50, may be integral with the journals 98 of the skewers. In assembly with the frame 85, the gears 102 back against the outer face of the frame 85 and spaced teeth 103 which project generally toward the handle 97 are engaged at the lower portions of the gears 102 in driving relation with a heavy gauge wire rod driving helix 104 carried on and about a drive shaft 105 to which the opposite ends of the helix are fixedly anchored in a suitable manner such as by welding. At one end, a journal terminal 107 on the shaft 105 is received in an upwardly opening bearing slot 108 of a forwardly projecting bearing flange 109 on that end of the frame 85. At its opposite end the frame 85 has a bearing flange 110 similar to the flange 109 and provided with an upwardly opening bearing slot 111 in which is received a journal portion 112 on the contiguous portion of the shaft 105. Beyond the journal 112, a coupling extension 113 on the shaft 105 is drivingly engageable with a power unit 114 which may be substantially the same as the previously described power unit 65 or 79. A bracket 115 attached as by means of screws 117 to the flange 110 is releasably engageably by a coupling plate 118 secured to the unit 114 and cooperating with the bracket 115 similarly as described for the coupling plate 74.

In another form of the skewered food cooking device, identified by 119 in FIGS. 12-14, an elongated supporting body frame 120 in the general form of a rectangular tube is constructed and arranged to be mounted along the rear wall 24 of the grill 21 and is equipped with means for replaceably supporting a plurality of loaded polygonal cross section skewers 121 generally cantilever fashion in cooking relation to the heat source provided by the grill 21, by mounting the skewers 121 in the cooking relation at their tip end portions, that is their end portions opposite handles 122. For this purpose, the frame 120 supports therein at suitable spaced intervals rotary hubs 123 extending between spaced front and rear walls 124 and 125 of the frame and journaled on bearing studs 127 carried by the walls. An entrance aperture 128 in the front wall 124 is aligned with a tapered lead-in 129 to a blind end socket bore 130 in each of the hubs 123 for supporting reception of the tip end portion of a respective one of the skewers 121. For corotational keying of the skewers 121, the socket bores 130 have a complementary polygonal cross section.

In order to retain the skewers 121 positively against dropping out of the socket bores 130, the body 124 is mounted on the wall 24 in generally upwardly and rearwardly tilted position whereby the skewers extend generally downwardly and rearwardly, substantially as shown in FIG. 13, so that gravity will retain the skewers against axial displacement from the sockets 130. For this purpose the frame 120 is provided with spaced mounting brackets 131 which may be attached thereto as by means of welding 132 and have respective shoulders 132 engageable upon the upper edge of the grill wall 24. A depending rear leg 133 on each of the brackets 131 carries threaded therethrough an attachment machine screw 134 arranged to thrust endwise against the back face of the wall 24 and to be locked in adjusted position as by means of a locknut 135. A depending front leg 137 on the bracket 131 extending below the frame 120 carries threaded therethrough a thumb screw 138 arranged to thrust endwise against the inner face of the grill wall 24 and maintain the frame 120 in properly rearwardly tilted position suitable to assure the downwardly and rearwardly oblique position of the skewers 121.

Means for effecting rotation of the hubs 123, and thereby effecting rotation of the skewers 121 about their axes, comprise respective gear members 139 fixedly coaxially mounted on the hubs 123 and having spaced gear teeth 140 arranged to mesh with a driving helix 141 coiled about a shaft 142 and secured at its opposite ends fixedly to the shaft, substantially the same as the helix 55 and the shafts 54 previously described. At its opposite end portions, the shaft 142 is suitably journaled on supporting bracket means 143 shown only at the right end of the frame 120 in FIG. 12 but it will be understood that it may be of the same general form at the opposite end of the body. A coupling extension 144 on the shaft 142 is engageable in driven relation with a powered drive unit 145 which may be of the same general type as the power unit 65 or 79 previously described and suitably replaceably mounted on a bracket 147 secured as by welding 148 to the adjacent end of the frame 120. Through this arrangement all of the gears 139 and the associated hubs 123 and the skewers 121 carried thereby are adapted to be driven rotatably in unison.

In FIG. 15 is depicted another means for retaining the skewers 38 of FIGS. 1-5 in cantilever fashion on the supporting body frame 27' in a simpler manner than on the frame 27. To this end, the rear wall 29' of the frame 27' has, at each skewer-supporting station a bearing slot 42' the same as the bearing slots 42 and receptive of the bearing hub of the gear member 50 of the associated skewer 38. However, for restraining the skewer 38 against unintentional upward displacement adjacent to its handle end, the front wall 28' has in general alignment with each of the bearing slots 42' a bayonet slot 149 which opens upwardly and has a lower lateral locking extension 150, with a recessed overhang 151 under which the mounted skewer is engaged. It will be observed that the entry portion of the slot 149 is offset relative to the receiving portion 150 from a vertical plane through the mounted axis of the skewer indicated by the dot-dash line, whereby in mounting the skewer 38 it is initially oriented in a laterally canted relation as shown in dash phantom outline generally aligned with the open ends of the slots 42' and 149. Then the skewer is dropped down as indicated by the directional arrows into the slots 42' and 149 and swung into the final operating position on the axis indicated by the dot-dash line. Orientation of the bayonet slot 149 is such as to facilitate engagement of the gear teeth 53 with the helical driver 55' on the drive shaft 54' during assembly of the skewer 38 with the frame 28' and by the same token disengagement of the teeth 53 from the helical driver 55' during separation of the skewer from the body 28'.

Figure 17:
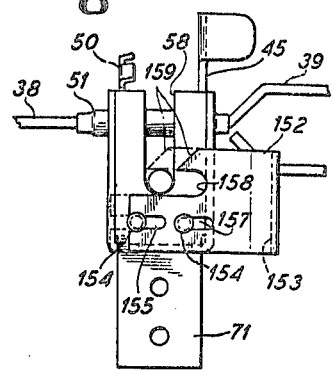
FIG. 17 is an end elevational view taken substantially in the plane of line XVII—XVII of FIG. 16.

In FIGS. 16 and 17, the device 20 is in all essential respects the same as in FIGS. 1-7 except that the supporting bracket pieces 59 and 62 are equipped with respective shaft-securing latches 152 of preferably identical construction formed as plates from suitable gauge sheet metal and each equipped with a right angular handle flange 153. Each of the latches 152 is slidably mounted on the outer face of the associated bracket piece as by means of rivet studs 154 fixed to the bracket piece and engaged in aligned spaced guide and shifting limit slots 155 and 157 in the body plate portions of the latches. For engagement with the respective cylindrical journal portions 57 and 60 of the shaft 54, the latches have respective laterally opening engagement recess notches 158 receptive of the associated journal by sliding movement of the respective latch 152 from a clearance position as shown in dash outline in FIG. 17 into a latching position as shown in full outline and wherein a retaining finger 159 of the latch overlies the associated journal and retains it against upward displacement from the respective bearing slot 58 or 61, until the latch 152 is released. Since the latches 152 are located at the opposite ends of the body 27 the latches can be identical, both being moveable into and out of latching position relative to the front side of the body. Through this arrangement, any tendency for either end of the shaft 54 to displace upwardly for any reason is thwarted until the latches are released.

Figure 18:
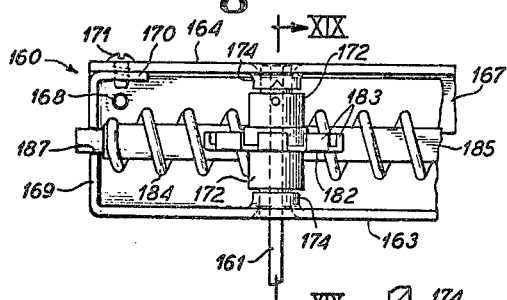
FIG. 18 is a fragmentary top plan view of a modification of the device represented in FIG. 12.
Figure 19:
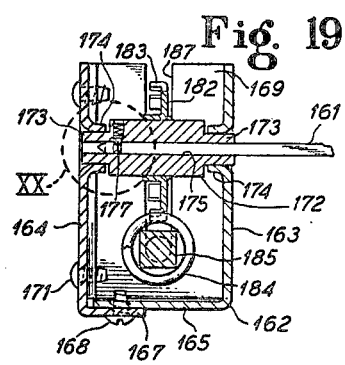
FIG. 19 is a vertical transverse sectional detail view taken substantially along the line XIX—XIX of FIG. 18.
Figure 20:
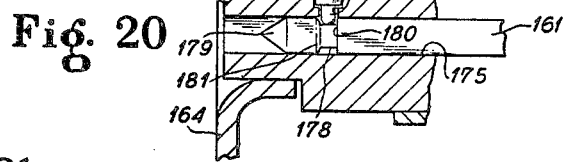
FIG. 20 is an enlarged fragmentary sectional detail view of that portion of FIG. 19 within the balloon XX.

In FIGS. 18-20, a skewered food cooking device 160 embodying features of the invention similar to the device 119 of FIGS. 13 and 14 is depicted showing certain simplifications and means whereby the device can be mounted in a manner to support skewers 161 in a horizontal position relative to a heat zone rather than a tilted position. To this end, the device 160 comprises a hollow, shell body 162 comprising a pair of generally coextensive complementary opposite upstanding spaced side wall members 163 and 164, respectively, constructed as separate pieces which are adapted to be secured together in assembly. For this purpose each of the members 163 and 164 is desirably of generally L-cross section wherein the member 163 has a bottom flange 165 of a width to gauge the width of the body and with which an oppositely extending angular bottom flange 167 on the member 164 is in underlapping engagement and fixedly secured in any suitable manner which may involve spot welding, but may conveniently be effected by means of fasteners such as self-driving screws 168. For further security, the opposite ends of the member 163 are provided with right angular end flanges 169 having right angular attachment flange extensions 170 engaged by the end portions of the member 164 and secured thereto in any suitable manner as by means of fasteners in the form of self-driving screws 171. This provides a sturdy upwardly opening structure for the body 162.

For supporting the skewers 161 rotatably, the body 162 is provided at suitable spaced intervals with rotary hubs 172 which in general respects are similar to the hubs 123 in FIGS. 13 and 14. However, in this instance, each of the hubs 172 has at its opposite end respective reduced diameter journal portions 173 rotatably engaged within inwardly drawn and aligned annular bearing flanges 174 formed on the body members 163 and 164.

An axial socket bore 175 through each of the hubs 172 is complementary in cross sectional shape to the shank of the skewer 161 to be received therein, such as square, and within which the tip end portion of the skewer is slidably received to a substantial extent sufficient to provide stable support for the loaded skewer. To hold the skewer 161 against accidentally slipping out of the socket bore 175, means in the form of a spring biased detent 177 carried by the hub 172 and having a rounded tip projecting radially through the wall of the bore 175 is automatically engageable in an annular detent groove 178 formed in the shank of the skewer 161 adjacent to its pointed tip 179. At its side opposite the tip 179, the groove 178 is defined by stop shoulder 180 so that on axial insertion of the skewer shank 161 into the bore 175 the tip 179 will cam the detent 177 yieldably out of interferring relation to the skewer shank until the detent snaps into the groove 178 and engages the shoulder 180. At its tip end side, the groove 178 is formed with an annular release cam shoulder 181 which is steep enough to cooperate with the detent 177 for holding the skewer 161 against removal from the hub 172 until deliberate manual pull-out force is exerted on the skewer to effect camming of the detent 177 out of the groove 178 to release the skewer. As a result the device 160 can be efficiently mounted to permit the skewers 161 supported thereby to extend substantially horizontally relative to a heat source whereby to assure uniform exposure of skewered food to the heat source.

Rotary drive of the hubs 172 and thereby the supported skewers 161 of the device 160 is adapted to be effected in substantially the same manner as described in respect to the hubs 123 and skewers 121 in the device 119 of FIGS. 13 and 14. That is, each of the hubs has fixedly mounted thereon a driven member such as a respective formed sheet metal gear 182 fixedly coaxially mounted on the hub and having gear teeth 183 arranged to mesh with a driving member comprising a helix 184 coiled about a shaft 185 and fixedly attached at its opposite ends to the shaft. At its opposite end portions the shaft 185 is suitably journaled in upwardly opening bearing slots 187 formed in the end flanges 169. It will be understood that the shaft 185 may be driven rotatably in any suitable manner such, for example, as described in connection with FIG. 12.

Figure 21:
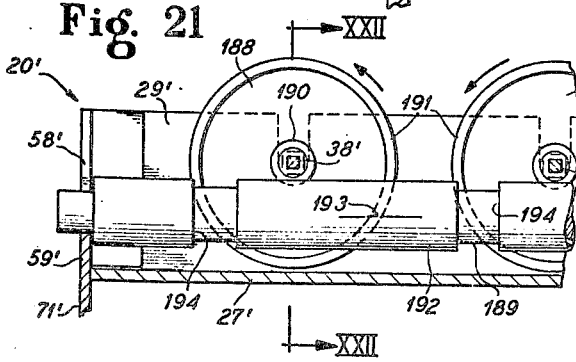
FIG. 21 is a fragmentary longitudinal vertical sectional elevational view showing another modified driving means for the skewers.
Figure 22:
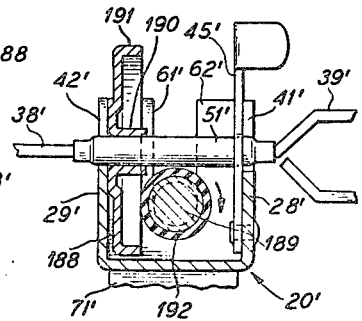
FIG. 22 is a transverse vertical sectional view taken substantially along the line XXII—XXII of FIG. 21.

In FIGS. 21 and 22, a further simplified means for rotatably driving the skewers 38' are disclosed. To this end, each of the skewers 38' which may otherwise be constructed substantially the same as the skewers 38 in FIGS. 1 or 15, or which may alternatively be constructed similar to any of the other forms of the skewer described herein, as may be preferred, are adapted to be rotated by means comprising a driven member 188 for each of the skewers, and a rotary driving member 189 common to all of the skewers and with which the driven members engage. For illustration the device 20' embodies substantially the same structure as the device 20 of FIG. 1, and has substantially the same body 27' having front and rear walls 28' and 29' and end brackets 59' and 62' having upwardly opening shaft bearing slots 58' and 61', respectively, as well as downwardly projecting motor mounting extensions 71'. In the illustrated instance, each of the driven members 188 comprises a disk of suitable material such as metal, having a hub 190 fixed on the adaptor sleeve 51' which is received in assembly with the body 27' in a selected set of the upwardly opening aligned slots 41' and 42' and to be locked against unintended upward displacement by means of the associated latch 45'. Each of the driven members 188 is adapted to back freely slidably against the inside face of the rear wall 29'.

Driving coaction between the driven members 188 and the driving member 189 is effected by friction means comprising an annular circumferential rim flange 191 projecting toward the driving member 189 in the assembly. The driving member 189 comprises a rotary shaft which is journaled in the upwardly opening bearing slots 58' and 61' and has a cylindrical friction surface 192 with which the friction rim 191 of each of the members 188 makes point driving contact as schematically indicated at 193 in FIG. 21. For this purpose, the friction surface 192 may be a heat resistant rubber, i.e. elastomeric sheath or coating on the perimeter of the shaft 189. At suitable intervals the friction driving surface 192 is interrupted by annular clearnace gaps 194 to accommodate the friction rim 191 chordally opposite the driving friction point 193. Preferably the direction of driving torque of the friction surface 192 is such as to rotate the driven members 188 in counter-clockwise direction as shown in FIG. 21 and this will reasonably assure that the counter-acting component of force will be generally downwardly on the shaft 189 so that there will be little tendency for the shaft to displace upwardly while in operation. However, should it be preferred or should the occasion require driving of the shaft in the opposite rotary direction, means such as the retaining latches 152 of FIGS. 16 and 17 may be employed on the end brackets 59' and 62'.

It will be understood that variations and modifications may be effected without departing from the spirit and scope of the novel concepts of this invention.

I claim as my invention:

1. A skewered food cooking device comprising, in combination with a cooking appliance having an upwardly extending front wall and means to provide a heat source inwardly from said front wall:

a narrow elongated bar-like body frame having an upstanding wall;

means on said body frame for attaching it along the top of said front wall of said cooking appliance;

a plurality of skewers adapted to support food to be cooked over said heat source and having elongated shanks pointed at one end and having handles at the opposite end;

said skewers having adjacent to said handles concentric corotative disk-like driven members for effecting rotation of said skewers;

journal means on said shanks rearwardly adjacent to said driven members;

said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source;

an elongated rotary driving member mounted longitudinally on said body frame below said slots and spaced forwardly from said upstanding wall sufficiently to receive downwardly extending portions of said driven members between said upstanding wall and said driven member;

and means for driving said driving member rotatably;

said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers.

2. A device according to claim 1, wherein said driving member has a helical driving surface thereon, and said disk-like members have gear teeth projecting forwardly toward and into meshing driving engagement with said helical driving surface.

3. A device according to claim 2, wherein said elongated driving member comprises a drive shaft and said helical driving surface comprises a wire rod helix mounted about said shaft and secured at opposite ends to said shaft and having substantially uniformly spaced coils providing said helical surface.

4. A device according to claim 1, wherein said disk-like members have annular circumferential rim flanges projecting toward said driving member, and said driving member comprises a rotary shaft having friction surface means in driving engagement with the edges of said rim flanges.

5. A device according to claim 1, wherein said body frame has a second upstanding wall in forwardly spaced relation to said first mentioned upstanding wall and located forwardly from said driving member, said second wall having upwardly opening slots aligned with the slots in said first mentioned upstanding wall, said skewers also having journal means received in said slots in said second wall, and means for releasably retaining said skewer shanks in said slots and located on said second wall.

6. A device according to claim 5, wherein said retaining means comprise sliding latches mounted on said second wall and movable between skewer retaining relation and skewer releasing relation having regard to said slots in said second wall.

7. A device according to claim 5, wherein said driving member comprises a shaft, said body frame having bracket means adjacent opposite ends and provided with upwardly opening bearing slots, said shaft having journal means engaged in said slots, and sliding latch means carried by said bracket means for locking said shaft journals in said slots.

8. A device according to claim 1, wherein said disk-like driven members have forwardly facing bearing surfaces for sliding bearing engagement with said upstanding wall of said body frame member.

9. A skewered food cooking device in combination with a generally pan-shaped cooking appliance having front and rear walls spaced apart with a heat source recess between the walls, and comprising:
a plurality of skewers;
a body frame;
means attaching said body frame to said front wall;
means on said body frame for replacably supporting said plurality of loaded skewers to project generally cantilever fashion in cooking relation over said recess and short of said rear wall;
a cover hingedly attached to said rear wall and adapted to be moved between a closed position over said recess and an open position, said cover having a front wall;
and means on said body frame for engagement by said front wall of said cover in the closed position of said cover.

10. A combination according to claim 9, wherein said means for supporting said front wall of said cover comprises a rest bracket member projecting above said body frame.

11. A skewered food cooking device comprising, in combination with a cooking appliance having an upwardly extending front wall and means to provide a heat source inwardly from said front wall:
a narrow elongated bar-like body frame having an upstanding wall;
means on said body frame for attaching it along the top of said front wall of said cooking appliance;
a plurality of skewers adapted to support food to be cooked over said heat source and having elongated shanks pointed at one end and having handles at the opposite end;
said skewers having adjacent to said handles concentric corotative disk-like driven members for effecting rotation of said skewers;
journal means on said shanks rearwardly adjacent to said driven members;
said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source;
an elongated rotary driving member mounted longitudinally on said body frame below said slots and spaced forwardly from said upstanding wall sufficiently to receive downwardly extending portions of said driven members between said upstanding wall and said driving member;
means for driving said driving member rotatably;
said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers;
attachment bracket means for and fixed on said body frame at spaced points adjacent to its respective opposite ends;
said bracket means having a downwardly facing shoulder means for engagement with the top edge of said appliance front wall;
said bracket means having spaced depending legs adapted to straddle said front wall;
and each of said legs carrying a generally horizontally extending fastening screw whereby said screw on one of said pair of legs is adapted to be thrustingly driven into engagement with one side of said front wall and said screw carried by the other of said pair of legs is adapted to be driven thrustingly into engagement with the opposite side of said front wall for adjusting said body frame relative to said front wall to effect proper attitude of said skewers relative to said heat source of said appliance.

12. A device according to claim 11, wherein one of said bracket legs is longer than the other of said legs and to screw carried by said longer leg is located at a lower elevation than said screw carried by said other of said legs of the pair on each respective bracket.

13. A device according to claim 11, wherein said body frame has a downwardly facing lower wall, and said brackets have seats engaged by the lower face of said wall.

14. A device according to claim 11, wherein said body frame comprises a vertically standing horizontally elongated wall panel, and said brackets being attached to said wall panel.

15. A device according to claim 11, in combination with a generally pan-shaped cooking appliance having a cooking heat source recess and provided with spaced upstanding front and rear walls, said elongated body frame removably mounted on said front wall with one of said bracket legs at the inside of said front wall and the other of said bracket legs at the outside of said front wall, said screws carried by said legs at the inside of said front wall engaging said inside of said front wall and said screws of said legs at the outside of said front wall engaging the outside of said front wall, said brackets supporting said body frame at the outside of said front wall and in part below the upper edge of said front wall, generally protected by said front wall from heat within said recess but with said skewers projecting across the top of said front wall into cantilever overlying relation to said heat source recess, said skewers having handles which project from said body frame in a direction away from said front wall entirely out of the way of direct heat from said recess.

16. A combination according to claim 15, comprising a cover hingedly attached to said rear wall and adapted to be swung between open and closed positions relative to said recess and said front wall, and a rest member on and projecting above said body frame and adapted to support said front edge of said cover when the cover is moved into closing position while said device is in position on said front wall.

17. A device according to claim 11, in combination with a cooking appliance of the upwardly opening pan type having an upstanding front wall and an upstanding rear wall and a heat source recess between said walls, said body frame being attached to said rear wall by engagement of said brackets on said rear wall with one of said legs of said brackets at the inner side of said rear wall and the other of said bracket legs at the outer side of said rear wall, said screws carried by the bracket legs respectively engaging the inner and outer sides of said rear wall and thereby securing said device to said rear wall, said screws being adjusted to tilt said body frame rearwardly relative to said rear wall whereby skewers supported endwise by said elongated body frame will project generally upwardly and forwardly over said recess, said skewers having handles on their ends remote from said body frame and said skewers being of a length such that said handles extend forwardly beyond said front wall.

18. A skewered food cooking device comprising, in combination with a cooking appliance having an upwardly extending front wall and means to provide a heat source inwardly from said front wall:
   a narrow elongated bar-like body frame having an upstanding wall;
   means on said body frame for attaching it along the top of said front wall of said cooking appliance;
   a plurality of skewers adapted to support food to be cooked over said heat source and having elongated shanks pointed at one end and having handles at the opposite end;
   said skewers having adjacent to said handles concentric corotative disk-like driven members for effecting rotation of said skewers;
   journal means on said shanks rearwardly adjacent to said driven members;
   said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source;
   an elongated rotary driving member mounted longitudinally on said body frame below said slots and spaced forwardly from said upstanding wall sufficiently to receive downwardly extending portions of said driven members between said upstanding wall and said driving member;
   means for driving said driving member rotatably;
   said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers;
   said appliance having a rear wall spaced substantially rearwardly from said upstanding front wall;
   a cover hingedly attached to said rear wall and adapted to be moved between a closed position over said heat source means and an open position;
   said cover having a front wall;
   and means on said body frame for engagement by said front wall of said cover in the closed position of said cover whereby to support the cover in a manner permitting freedom of operation of said driving means and said skewers.

19. A skewered food cooking device comprising, in combination with a cooking appliance having an upwardly extending front wall and means to provide a heat source inwardly from said front wall:
   a narrow elongated bar-like body frame having an upstanding wall;
   means on said body frame for attaching it along the top of said front wall of said cooking appliance;
   a plurality of skewers adapted to support food to be cooked over said heat source and having elongated shanks pointed at one end and having handles at the opposite end;
   said skewers having adjacent to said handles concentric corotative disk-like driven members for effecting rotation of said skewers;
   journal means on said shanks rearwardly adjacent to said driven members;
   said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source;
   an elongated rotary driving member mounted longitudinally on said body frame below said slots and spaced forwardly from said upstanding wall sufficiently to receive downwardly extending portions of said driven members between said upstanding wall and said driven member;

means for driving said driving member rotatably;

said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers;

said driving member comprising a driving shaft having a heavy gauge wire rod helix provided with substantially uniformly spaced coils and disposed concentrically about the shaft and providing helical driving surface;

said driven members comprising gear disks having gear teeth extending angularly forwardly on the perimeter of the disks and meshing drivingly with said coils;

and said shaft being of multi-sided polygonal cross-section and said coils of said helix being loosely corotative relative to said shaft whereby to enable ready adjustment of said coils longitudinally of said shaft.

20. A skewered food cooking device comprising, in combination with a cooking appliance having an upwardly extending front wall and means to provide a heat source inwardly from said front wall:

a narrow elongated bar-like body frame having an upstanding wall;

means on said body frame for attaching it along the top of said front wall of said cooking appliance;

a plurality of skewers adapted to support food to be cooked over said heat source and having elongated shanks pointed at one end and having handles at the opposite end;

said skewers having adjacent to said handles concentric corotative disk-like driven members for effecting rotation of said skewers;

journal means on said shanks rearwardly adjacent to said driven members;

said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source;

an elongated rotary driving member mounted longitudinally on said body frame below said slots and spaced forwardly from said upstanding wall sufficiently to receive downwardly extending portions of said driven members between said upstanding wall and said driven member;

means for driving said driving member rotatably;

said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers;

said elongated rotary driving member comprising a shaft having journal means on opposite end portions thereof;

at least one end of said shaft having means thereon for a coupling said shaft to a power unit;

a power unit coupled with said one end portion of said shaft;

and respective supporting brackets at opposite ends portions of said body frame having upwardly opening bearings in which said journals are received by dropping said shaft into place in the body frame by engagement of said journals in said bearings and from which said shaft can be removed by lifting said shaft upwardly relative to said bearings for cleaning and the like.

21. A skewered food cooking device comprising, in combination with a cooking appliance having an upwardly extending front wall and means to provide a heat source inwardly from said front wall:

a narrow elongated bar-like body frame having an upstanding wall;

means on said body frame for attaching it along the top of said front wall of said cooking appliance;

a plurality of skewers adapted to support food to be cooked over said heat source and having elongated shanks pointed at one end and having handles at the opposite end;

said skewers having adjacent to said handles concentric corotative disk-like driven members for effecting rotation of said skewers;

journal means on said shanks rearwardly adjacent to said driven members;

said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source;

an elongated rotary driving member mounted longitudinally on said body frame below said slots and spaced forwardly from said upstanding wall sufficiently to receive downwardly extending portions of said driven members between said upstanding wall and said driven member;

means for driving said driving member rotatably;

said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers;

said means for driving said driving member rotatably comprising a power unit;

and said driving member comprising a shaft having a stepped selective coupling terminal structure on one end comprising a polygonal cross section terminal extremity dimensioned to be received in a complementary output member of said driving power unit, and a larger dimension polygonal crosssection coupling portion adjacent to said terminal extremity for reception drivingly in a commplementary drive unit output member of larger differential size than will couple with said terminal extremity.

22. A skewered food cooking device adapted to be mounted on a cooking grill having an upwardly extending front wall and defining a recess to provide a heat source inwardly from said front wall, said device comprising:

a narrow elongated bar-like body frame having an upstanding wall;

means on said body frame for attaching it along the top of said front wall of said cooking appliance;

a plurality of skewers adapted to support food to be cooked over said heat source and having elongated shanks pointed at one end and having handles at the opposite end;

said skewers having adjacent to said handles concentric corotative disk-like driven members for effecting rotation of said skewers;

journal means on said shanks rearwardly adjacent to said driven members;

said upstanding wall of said body frame having upwardly opening spaced slots within which said journal means are received by downward movement of the skewers and wherein said slots provide cantilever bearing for said journal means to support said pointed end shank portions of said skewers in cantilever rearwardly projecting relation from said upstanding wall into overhanging relation to said heat source recess;

an elongated rotary driving member mounted longitudinally on said body frame below said slots and spaced forwardly from said upstanding wall sufficiently to receive downwardly extending portions of said driven members between said upstanding wall and said driven member;

and means for driving said driving member rotatably; said downwardly extending portions of said disk-like driven members extending down between said upstanding wall and said driving member and engaging drivingly in forwardly bearing engagement with said driving member so that the driven members are rotatably driven by said driving member, and by such engagement of the disk-like driven members with said driving member cooperating with said cantilever bearing for affording cantilever stabilization for the skewers.

23. A device according to claim 22, wherein said disk-like driven members have forwardly facing bearing surfaces for sliding bearing engagement with said upstanding wall of said body frame member.

* * * * *

UNITED STATES PATENT AND TRADEMARK OFFICE
CERTIFICATE OF CORRECTION

PATENT NO. : 4,154,154
DATED      : May 15, 1979
INVENTOR(S) : Weldon B. Vivian

It is certified that error appears in the above-identified patent and that said Letters Patent are hereby corrected as shown below:

Column 12, line 64 for "to" read --said--.

Column 13, line 32 for "said front" read --the front--;

and for "the cover" read --said cover--.

Column 17, lines 3 and 4 for "commplementary" read

--complementary--.

Signed and Sealed this

Fourth Day of December 1979

[SEAL]

Attest:

Attesting Officer

SIDNEY A. DIAMOND
Commissioner of Patents and Trademarks